United States Patent [19]

LaFleur

[11] Patent Number: 5,539,054
[45] Date of Patent: Jul. 23, 1996

[54] POLYURETHANE ELASTOMER BLENDS

[75] Inventor: Edward E. LaFleur, Warminster, Pa.

[73] Assignee: Rohm and Haas Company, Phila., Pa.

[21] Appl. No.: 392,669

[22] Filed: Feb. 23, 1995

Related U.S. Application Data

[63] Continuation of Ser. No. 206,237, Mar. 4, 1994, abandoned, which is a continuation of Ser. No. 14,893, Feb. 8, 1993, abandoned.

[51] Int. Cl.$^6$ ...................................................... C08F 8/30
[52] U.S. Cl. ............................ 525/125; 525/127; 525/937
[58] Field of Search ................................... 525/125, 127, 525/937

[56] References Cited

U.S. PATENT DOCUMENTS

| | | | |
|---|---|---|---|
| 4,141,879 | 2/1979 | McCarroll | 260/37 |
| 4,179,479 | 12/1979 | Carter | 525/66 |
| 4,317,890 | 3/1982 | Goyert et al. | 525/66 |
| 4,342,847 | 8/1982 | Goyert et al. | 525/66 |
| 5,059,632 | 10/1991 | Horn et al. | 521/137 |
| 5,061,424 | 10/1991 | Karimi et al. | 264/171 |
| 5,156,601 | 10/1992 | Lorenz | 604/307 |

FOREIGN PATENT DOCUMENTS

| | | |
|---|---|---|
| 2044743 | 6/1991 | Canada . |
| 12343B1 | 5/1979 | European Pat. Off. . |
| 443432A2 | 2/1991 | European Pat. Off. . |
| 392625 | 2/1991 | Germany . |

OTHER PUBLICATIONS

Chemical Abstracts, vol. 82, No. 12 (1975) Abstract No. 74208p.
Polyurethane Elastomers, C. Hepburn, Applied Science, London 1982.
Polymer Blends, S. Krause, vol. 1, Chap. 2, Academic Press, NY, 1978.
Toughened Plastics, p. 10, C. Bucknall, Applied Science, London 1977.

*Primary Examiner*—D. S. Nakarani
*Attorney, Agent, or Firm*—Richard A. Haggard

[57] ABSTRACT

The invention relates to thermoplastic polyurethane blends containing at least one thermoplastic polyurethane and at least one copolymer, the copolymer derived from at least 5 weight percent of an N-vinyl lactam monomer unit. Blends of the invention generally are compatible or miscible, and many exhibit clarity and other physical properties, such as tensile modulus, distortion resistance and impact resistance, which are improved over the properties of the thermoplastic polyurethane component of the blend or of thermoplastic polyurethanes blends in the art.

19 Claims, No Drawings

POLYURETHANE ELASTOMER BLENDS

This application is a continuation of application Ser. No. 08/206,237 filed Mar. 4, 1994, now abandoned, which in turn is a continuation of application Ser. No. 08/014,893, filed Feb. 8, 1993, now abandoned.

FIELD OF THE INVENTION

The present invention relates to blends of one or more thermoplastic polyurethane elastomers (TPPUEs) and one or more copolymers containing polymerized units of N-vinyl lactam, the combination termed a TPPUE blend. More specifically, the invention relates to TPPUE blends wherein the N-vinyl lactam copolymer contains copolymerized units of an acid-containing monomer, or of an amido-containing monomer, or of one or more units of a wide range of ethylenically unsaturated monomer(s). It further relates to blends having an imidized N-vinyl lactam-containing copolymer. It also relates to TPPUE blends with polar polymers, in which blends the copolymer compatibilizes or makes miscible the polar polymer with the TPPUE of the blend. The novel TPPUE blends of the invention have improved thermal, mechanical, and optical properties in comparison with the properties exhibited by unblended TPPUE and other TPPUE blends in the art.

BACKGROUND OF THE INVENTION

Thermoplastic polyurethane elastomers (TPPUE) may be described as multiblock copolymers of general structure represented by $(A-B)_n$, where A and B are hard and soft segments, respectively, and n is >1, typically >10 and often >100. TPPUEs are prepared from mixtures of diisocyanates, diols, and, often, low molecular weight polyol or polyamine chain extenders, which after reaction yield the multiblock copolymers. TPPUEs also may be prepared from diisocyanates, polyester or polyether diols or diamines, and low molecular weight polyols, polyamines, or mixtures of polyols and polyamines. The soft segment (B) typically results from a polyether or polyester diol component while the hard segment (A) typically results from the diisocyanate component. A book, *Polyurethane Elastomers*, by C. Hepburn (Applied Science, London, 1982), particularly Chapter 9 therein, broadly describes TPPUEs of the type related to the invention.

The known TPPUEs and blends containing TPPUEs all suffer some drawbacks in one or more properties, including mechanical properties, color stability to heat and light, clarity, and useful heat distortion properties. For example, in TPPUEs, the hard segments tend to agglomerate to form glassy and semi-crystalline phases in an elastomeric matrix of the soft segments, often leading to microphase separation (often termed "nacreous effect") due to incompatibility between, for example, polyether or polyester soft (B) segments and the hard urethane or urea (A) blocks. Phase separation becomes visually obvious when the elastomers are dyed or pigmented. The occurrence of phase separation is disclosed, for example, in U.S. Pat. No. 4,179,479, wherein polymeric blends are prepared from acrylonitrile/ butadiene/styrene ("ABS") graft copolymers, high molecular weight (500,000 to 1,500,000) acrylate polymers and thermoplastic polyurethanes. All of the '479 patent compositions showed evidence of the nacreous effect and poor low and room temperature mechanical properties. Phase-separated materials also generally show poor tear resistance; hence, molded articles with reduced wall thickness, such as ski boot fastenings, do not possess sufficient toughness to withstand severe stress conditions. Another problem is achieving toughness above about 40M Pascal in TPPUEs or known TPPUE blends, and attempts to improve one property, such as toughness, often lead to degeneration of another property. For example, an attempt to improve the mechanical properties of TPPUEs (German Offenlegungsschrift 2,854,409) led to TPPUEs from a combination of polyester diols and diisocyanates, chain extended with 1,4-butane diol; the resulting TPPUEs had increased hardness and modulus but poor low temperature impact properties and evidence of extensive phase separation. Another attempt to prepare high modulus elastomer (German Offenlegungsschrift 2,854,407) wherein the elastomers described were melt processable blends of TPPUE's, based on polyethers or polyesters, urethanes and a graft copolymer consisting of a 95 to 65 weight percent rubbery core and a 35 to 5 wt. % hard shell, yielded mechanical properties of their blends which were compromised by severe phase separation.

Achieving good color stability also has been a problem in TPPUE blends. For example, in EP 12,343, the described elastomers were prepared from high molecular weight polyethylene oxide, polypropylene oxide ether diols, and diisocyanates. In spite of the fact that final product compositions were stabilized by the incorporation of thermoplastic graft copolymers, the resulting elastomers exhibited a yellow tinge characteristic of thermal instability and also showed poor low temperature impact and tensile modulus. Achieving good clarity in TPPUE blends has been another problem in the art, related to the nacreous effect, mentioned above, and to other factors. For example, German patent application, DE3925635-A, discloses ternary blends comprising polycarbonate based on 1,1-bis-4-hydroxyphenyl-cycloalkane, thermoplastic polyurethane and vinyl monomer-rubber graft copolymer. The blend compositions are reported to possess favorable balances of processing characteristics and physical and mechanical properties, but the multiphase nature of the blends does not provide optical clarity. European patent application, EP-443432-A, provides polymeric blends of thermoplastic polyurethane elastomers with graft elastomers consisting of butadiene or $C_{1-10}$ alkyl acrylate cores crosslinked or graft linked to alpha methyl styrene, (meth)acrylonitrile and or methyl methacrylates. Many examples of TPPUE blends exist in the art, but few exhibit clarity.

Achieving TPPUE blends with useful heat distortion temperature characteristics also has been a problem. For example, polymeric blends disclosed in U.S. Pat. No. 4,141, 879 comprise a polyamide homo- or co-polymer and a polyurethane reinforced with a relatively small amount of glass fibers, were disclosed possessing high heat distortion temperatures and utility for under-the-hood automotive or truck components, but these multi-component systems are prone to phase separation due to poor compatibility.

Thus, problems exist in achieving toughness and related mechanical properties, stable color, clarity, and higher heat distortion temperatures in TPPUE's and blends containing TPPUE's. The present invention teaches new compositions and their preparation and use in overcoming one or more problems with known materials by providing compatible or miscible blends, many of which are clear blends, containing TPPUE and one or more copolymers containing N-vinyl-lactam.

SUMMARY OF THE INVENTION

The blends of the present invention overcome one or more of the known problems in the field of thermoplastic polyurethane elastomer technology. All of the copolymers effective in the TPPUE blends of the invention are derived from at least 5 weight percent, based on the weight of the copolymer, of an N-vinyl lactam monomer. Thus, there is provided a thermoplastic polyurethane elastomer (TPPUE) blend comprising:

from about 0.5 to about 99.5 weight percent of at least one TPPUE; and from about 99.5 to about 0.5 weight percent of a copolymer derived from monomer units comprising from about 5 to about 95 weight percent of an N-vinyl lactam and from about 95 to about 5 weight percent of at least one ethylenically unsaturated monomer unit (the weight percent of monomer units based upon the weight of the copolymer).

The inventive blends described herein are capable of, but not limited to, conferring one or more of the following improvements to TPPUE and TPPUE blends:

Increasing the heat distortion, toughness, melt viscosity, clarity, weatherability and hydrolytic stability of thermoplastic polyurethane elastomers without significantly reducing the low temperature impact, thermal stability and optical clarity of the TPPUE;

Improving compatibility, hydrolytic stability and optical clarity of blends of polyether diol-, polyester diol-, and alkyl diol-based TPPUE's;

Improving compatibility of blends of TPPUE's, in general, with polar polymers.

Broadly, the invention provides compatible or miscible blends of TPPUE's, many of which blends exhibit high clarity (none are less clear than the TPPUE of the blend), and which blends also possess a balance of useful mechanical properties ranging from the ductility of the TPPUE alone to the rigidity of hard thermoplastics. The blends, like the TPPUE component of the blends, are characteristically hydrolysis resistant. The incorporation of, for example, N-vinyl lactam/acrylic copolymers into TPPUE's does not produce any substantial amount of yellowing. Many of the blends of the invention preserve low temperature flexibility of the TPPUE and exhibit remarkable impact strength, while also showing improvement in room and higher temperature mechanical properties. Many of the blends also are ductile at temperatures below −20° C. and display useful mechanical strength at these temperatures, and have specific gravity ranging from 1.10 to 1.20 and a Shore-D hardness of from 55 to 80. Many of the inventive blends, in addition to having clarity and low yellowness, also show an absence of pearlescence due to reduced phase separation of hard from soft segments, and are uniform in color when dyed. Some blends of the invention confer useful tensile modulus and high heat distortion resistance to the TPPUE of the blend without requiring substantial change in the ratio of hard to soft segment. The present invention further makes available TPPUE blends which have superior low temperature impact property and high tensile modulus at room temperature and above.

The invention also provides blends which have three (ternary) or more (e.g. quarternary and higher) components. For example the blends may comprise more than one TPPUE and an acrylic or a styrenic copolymer of N-vinyl lactam.; or one or more TPPUE, the N-vinyl lactam-containing copolymer, and one or more of a polar polymer such as poly(vinyl chloride)(PVC), ethylene/vinyl alcohol copolymer (EVOH), polyester, polyamide, and the like. The ethylenically unsaturated monomer unit(s) copolymerized with N-vinyl lactam in forming the copolymer of the invention may be selected from a wide range of monomers such as non-polar or polar monomers, monomers bearing amidofunctionality, acid-containing monomers, and other monomers described hereinbelow. The copolymer also may contain glutarimide groups resulting from the imidization of N-vinyl lactam/methacrylic ester copolymers. The copolymer also may be a multi-stage polymer having the essential N-vinyl lactam polymerized in one or more of the outer stages of the multi-stage polymer.

The TPPUE blends of the invention are injection or extrusion moldable into useful articles, for example, automotive parts, cables, pipes, hoses and tubings, sheet and blown film, the articles having one or more improved properties mentioned above and as described more fully hereinbelow.

DETAILED DESCRIPTION OF THE INVENTION

The blends of the invention comprise one or more TPPUE and one or more copolymer derived from N-vinyl lactam and at least one ethylenically unsaturated monomer.

The thermoplastic polyurethane elastomer (TPPUE) component of the blends of the invention may be any of those TPPUE currently known or may be prepared from mixtures of the following components:

an aromatic or aliphatic diisocyanate, this component forming a "hard segment,"

a low molecular weight (generally <400 daltons) diol, polyol or diamine "chain extender"; and a higher molecular weight (generally between about 500 and 5,000 daltons) polyether-based diol or a polyester-based diol, or a $C_2$–$C_8$ alkyl-based diol, or mixtures thereof, forming a "soft segment."

Diisocyanate compounds which form the hard segments of TPPUE's include, for example: 1,4'-dicyclohexylmethane diisocyanate, 3-isocyanatomethyl-3,5,5-trimethylcyclohexyl isocyanate, cyclohexylene-1,4-disocyanate, 2,4-toluene diisocyanate, 2,6-toluene diisocyanate, mixtures of 2,4-toluene diisocyanate with 2,6-toluene diisocyanate, 4,4'-methylenebis(phenyl isocyanate), 2,2-diphenylpropane-4,4'-diisocyanate, p-phenylene diisocyanate, m-phenylene diisocyanate, xylene diisocyanate, 1,4-naphthalene diisocyanate, 1,5-naphthalene diisocyanate, 4,4'-diphenyl diisocyanate, azobenzene-4,4'-diisocyanate, m- or p-tetramethylxylene diisocyanate and 1-chlorobenzene-2,4-diisocyanate, 1,6-hexamethylene diisocyanate, 4,6'-xylylene diisocyanate, 2,2,4-(2,4,4-)trimethylhexamethylene diisocyanate, 3,3'-dimethyldiphenyl 4,4'-diisocyanate, 3,3'-dimethyl-diphenylmethane 4,4'-diisocyanate, and the like.

The chain extender may be a low molecular weight (typically from about 60 to about 400 daltons) straight-chain aliphatic polyol, such as a diol or higher -ol, or a diamine, aromatic diol or diamine, and optionally may include a small amount of a triol. Examples of polyols include: 1,2-ethane diol, 1,2-propane diol, 1,3-propane diol, 1,2- or 1,4-butane diol, 1,4-pentane diol, 1,6-hexane diol, 1,4-cyclohexane diol, glycerine, hydroquinone diethylol ether, resorcinol ethylol ether and derivatives, and the like. Examples of low molecular weight aromatic diamines include: 3,3'-dichloro-4,4'-diaminodiphenyl-methane, 4,4'-diaminodiphenyl-methane, 1,4-diaminobenzene, 3,3'-dimethoxy-4,4'-diamino biphenyl, 3,3'-dimethyl-4,4'-diamino biphenyl, 4,4'-diamino biphenyl, 3,3'-dichloro-4,4'-diamino biphenyl, and the like.

Polyester diol, or polyether diol, or the above described alkyl diol, or mixtures thereof, optionally with extender, form the soft segment of the TPPUE. Polyester diol may be prepared from a combination of one or more dihydric alcohols and one or more dicarboxylic acids. The following dicarboxylic acids may constitute the polyester diol: adipic, succinic, sebacic, suberic, methyladipic, glutaric, pimelic, azelaic, thiodipropionic, citraconic and aromatic dicarboxylic acids. The dihydric alcohol (diol) component of the polyester may be any of the following: 1,2-propylene glycol, 1,3-propylene glycol, 1,4-butanediol, 1,3-butanediol, 2-methylpentanediol, 1,5-diethylene glycol, 1,5-pentanediol, 1,6-pentanediol, 1,12-dodecanediol, and the like. Of the alkyl-based diols, $C_2$–$C_8$ alkyl diols, that is, those diols having an alkyl group containing from 2 to 8 carbon atoms, some of which alkyl diols are exemplified above, are preferred. The polyester diol also may comprise hydrocarboxylic acids, lactones and carbonates. The polyether diol may be prepared from a condensation product of one or more of alkylene glycols from among which, ethylene glycol, 1,2-propylene glycol, 1,3-propylene glycol, 1,4-butane diol, and 1,5-pentanediol are preferred. Another source of polyether diols may use tetrahydrofuran in the preparation of polyalkylene ether glycol. The polyether diol also may be an ether glycol prepared from ethylene oxide, propylene oxide, or tetrahydrofuran. Molecular weights of TPPUEs typically range from about 5,000 to about 200,000 daltons, preferably from 10,000 to about 50,000 daltons.

Preferred blends of the invention are those wherein the at least one TPPUE is derived from a diol selected from a $C_2$–$C_8$ alkyl-based diol, a polyether-based diol, a polyester-based diol, or from mixtures of these. Other preferred blends are those wherein the at least one TPPUE comprises an admixture of a polyether diol-based TPPUE and a polyester diol-based TPPUE. Optimum blend ratios are contemplated having approximately one-third by weight of each of these two TPPUEs and one third the copolymer. Thus, a highly preferred ternary blend exists wherein each of two TPPUEs comprises from about 25 to about 40 weight percent of the blend.

Blends of the invention are compatible or miscible, and all exhibit some clarity to transmitted light, that is, the blends have clarity which is at least equal to that of the TPPUE component of the blend. By "compatible blend" is meant a blend which is essentially homogeneous to the eye and which possesses some physical properties which are enhanced over, or the result of a combination of, the properties of the constituents of the blend. By "misible blend" is meant a blend that is homogeneous at the molecular level, that is, a blend that may be shown by instrumental methods to be essentially homogeneous below distances of about 100 Angstroms. Miscible blends typically show a negative free energy of mixing and enhanced property development over the properties of their constituents. Enhanced clarity often is a good indicator of "miscibility" of a blend.

The second component of the blend of the invention, and essential to the utility of the invention, is a copolymer derived from the copolymerized units of from about 95 to about 5 parts of an ethylenically unsaturated monomer and from about 5 to about 95 parts of a N-vinyl lactam. A preferred blend results wherein the N-vinyl lactam monomer has the following structural formula

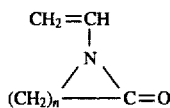

wherein n is an integer of 2 to 4. Examples include N-vinylpropiolactam, N-vinylpyrrolidone (i.e. N-vinylbutyrolactam), and N-vinylcaprolactam. N-vinylpyrrolidone ("NVP," n=3) is a preferred lactam because of its commercial availability and its facile copolymerizability with a broad range of ethylenically unsaturated monomer units.

A portion of the N-vinyl lactam monomer unit from which the copolymer is derived may be substituted by, that is, removed and replaced in part by, other amido-containing monomer units. Thus, the TPPUE blend may have a copolymer wherein from about 5 to about 75 weight %, preferably from about 10 to about 50 weight %, of the weight of the N-vinyl lactam monomer unit of the copolymer is substituted (replaced) by a copolymerizable amido-containing monomer unit selected from a vinyl amide, an amido-ethyl acrylic or methacrylic (abbreviated "(meth)acrylic") ester, an ureido-ethyl(meth)acrylic ester, an N-vinyl amide, or mixtures thereof. Each of these amido-containing monomers, further exemplified below, may be substituted for a portion of the N-vinyl lactam unit. Thus, the vinyl amide monomer unit contemplated to replace part of the N-vinyl lactam has the structure

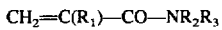

where $R_1$ is H or $CH_3$, $R_2$ and $R_3$ may be the same or different and are H, $C_1$–$C_4$ alkyl, or the same alkyl bearing amino functionality such as, for example, acrylamide, methacrylamide, N-[3-(dimethylamino)propyl]methacrylamide, N-[3-(diethylamino)propyl]acrylamide, and the like. The amido- or ureido-containing ethyl(meth)acrylic monomer contemplated for replacing part of the N-vinyl lactam has the structure

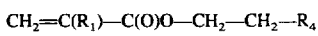

or

where $R_1$ and $R_2$ are as defined above, and $R_4$ is a urea or cyclic ureido structure of the formula

or

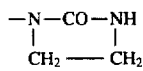

Methacryloylethyl ethylene urea is a preferred ureido-ethyl methacrylic ester because of its availability, its facile copolymerizability, and its TPPUE-interactive polar nature. The N-vinyl amide monomer useful in replacing part of the N-vinyl lactam has the structure

where $R_5$ is H or $C_1$–$C_4$ alkyl, such as N-vinylacetamide and the like.

Thus, one preferred TPPUE blend has a copolymer wherein the copolymerizable amido-containing monomer is selected from acrylamide, methacrylamide, methacryloylethyl ethylene urea, or N-vinyl acetamide.

Other ethylenically unsaturated monomers, one or more of which may be copolymerized with N-vinyl lactam in forming the copolymer, include $C_1$–$C_8$ alkyl acrylate, $C_1$–$C_4$ alkyl methacrylate, vinyl esters such as vinyl acetate, vinyl butyrate, and the like; vinyl aromatics such as styrene, alpha-($C_1$–$C_4$ alkyl)styrene and the like; functional esters of (meth)acrylic acid, such as glycidyl methacrylate, 2-hydroxyethyl methacrylate, generally the $C_2$–$C_4$ hydroxyalkyl(meth)acrylates, and the like; olefins, for example, $C_2$–$C_8$ primary olefins; vinyl halide; vinylidene halide; and nitrile monomers such as (meth)acrylonitrile and the like. One or more of these monomers may be used in copolymerization with N-vinyl lactam, the only requirement as to the amount used being that one or more comonomer is present in at least about 5 weight percent of the copolymer. Among the (meth)acrylic esters, $C_1$ to $C_4$ alkyl esters are preferred; especially preferred are ethyl acrylate, methyl methacrylate, butyl methacrylate, or mixtures of these, and among these, most preferred is methyl methacrylate ("MMA"). These (meth)acrylic monomers are preferred due to their commercial availability, low cost, and excellent weathering and other physical properties; MMA is particularly outstanding in cost and weatherability. The previously noted monomers containing amido-functionality, such as acrylamide, methacrylamide, amido- (i.e. urea-) ethyl ester (meth)acrylates, ureido-ethyl(meth)acrylates, and the like, may be used with these ethylenically unsaturated monomer units. Other monomer units useful in making copolymers of the invention will be known to those skilled in the art. So long as the monomer unit use is not detrimental to the preparation or use of the copolymer or blends of the invention, it may be used in deriving the N-vinyl lactam copolymer of the TPPUE blend of the invention. Examples of preferred copolymers for use in TPPUE blends comprise an ethylenically unsaturated monomer of the copolymer selected from a $C_1$–$C_8$ alkyl acrylate, a $C_1$–$C_4$ alkyl methacrylate, vinyl acetate, a $C_2$–$C_4$ hydroxyalkyl acrylate, a $C_2$–$C_4$ hydroxyalkyl methacrylate, a $C_2$–$C_8$ primary olefin, a vinyl halide, a vinylidene halide, styrene, alpha-($C_1$–$C_8$alkyl)styrene, (meth)acrylonitrile, or mixtures thereof.

A preferred blend of the invention has a copolymer which is derived from monomer units comprising from about 5 to about 60 weight percent NVP and from about 40 to about 95 weight percent of $C_1$–$C_8$ alkyl acrylate or $C_1$–$C_4$ alkyl methacrylate, the weight percents based on the weight of the copolymer. Another preferred copolymer comprises from about 10 to about 50 weight % NVP and from about 50 to about 90 weight % MMA.

The copolymer of the invention also may contain from about 1 to about 10 parts of one or more of a copolymerized acid monomer unit. Contemplated acid monomer units are those containing, for example, carboxylic acid, sulfonic acid, phosphonic acid, and the like, such as those acids incorporated in monomer units of (meth)acrylic acids, p-vinylbenzene-sulfonic acid, beta-methacryloxyethylphosphonic acid, and the like. Preferred are carboxylic acids selected from acrylic, methacrylic, crotonic, itaconic acid, maleic acid, fumaric acid, acryloxypropionic acid, alpha-methylene-deltamethylglutaric acid, or mixtures thereof. Methacrylic acid ("MAA") and acrylic acid ("AA") are highly preferred due to their commercial availability, relatively low cost, and good weatherability. Thus, one of the preferred blends of the invention comprises from about 5 to 95 wt. % of at least one TPPUE; from about 95 to about 5 wt. % of a copolymer comprising from about 5 to about 49 wt. % NVP; front about 50 to about 94 wt % of a monomer unit selected from MMA or styrene; and front about 1 to about 10 wt % of an acid monomer unit selected front AA or MAA, the wt % monomer units based on the weight of the copolymer. Another preferred TPPUE blend has a copolymer comprising from about 5 to about 39 wt. % NVP; from about 60 to about 94 wt. % MMA, and from about 1 to about 5 wt. % MAA.

Another useful TPPUE blend of the invention has a copolymer which is a multistage copolymer containing N-vinyl lactam in at least one of its outer stages. Multistage (also termed "core/shell" or "sequentially grafted") polymers and copolymers are known. Thus the TPPUE blend may comprise from about 0.5 to about 99.5 weight percent of at least one TPPUE; and from about 99.5 to about 0.5 weight percent of a multi-stage polymer comprising:

from about 30 to about 90 weight percent (based on the weight of the multi-stage polymer) of a first stage polymer derived from a monomer unit selected from butadiene, styrene, a $C_2$–$C_8$ alkyl acrylate, a $C_1$–$C_4$ alkyl methacrylate, or mixtures thereof; and from about 10 to about 70 weight percent (based on the weight of the multi-stage polymer) of at least one outer stage grafted polymer derived from about 5 to about 35 weight percent of N-vinyl lactam and from about 95 to about 65 weight percent of a monomer unit selected from $C_1$–$C_2$ alkyl acrylate, $C_1$–$C_4$ alkyl methacrylate, styrene, alpha-methyl styrene, vinyl toluene, or mixtures thereof, and from about 0 to about 10 weight percent of an acid monomer unit selected from (meth)acrylic acid, crotonic acid, maleic acid, fumaric acid, itaconic acid, 3-phenyl-2-propenic acid, or mixtures thereof, the weight percent monomer units in the at least one outer stage polymer based on the weight of the at least one outer stage polymer.

The multi-stage copolymer described above may be used as the sole copolymer of the blend or as a second copolymer used with one or more copolymers of the blend as otherwise described herein. When used as a second copolymer, the effective use level contemplated for the above-defined multi-stage polymer is from about 0.5 to about 60 weight percent, preferably from about 10 to about 40 weight percent, of the weight of the blend. Thus, one of the preferred blends comprises from about 0.5 to about 60 wt. % of the blend of the above-described multi-stage polymer and further comprises from about 39.5 to about 99 wt. % of the blend of a copolymer derived from monomer units of the N-vinyl lactam and ethylenically unsaturated monomer units previously defined.

Another useful copolymer contemplated by the invention is a methacrylic imidized polymer ("MIP"), that is, a methacrylic ester-containing polymer containing imide, specifically dimethylglutarimide, groups on the copolymer backbone containing the essential N-vinyl lactam. The process of "imidizing" polymers useful in the blends of the invention is known, as further described hereinbelow. Preferred are MIPs prepared front polymers and copolymers of MMA wherein the dimethylglutarimide groups on the MMA-containing backbone result from reactions with amines selected from ammonia, methyl amine, butyl amine, cyclohexyl amine and the like; the most preferred MIPs are those prepared from methyl amine. There is thus provided a TPPUE blend wherein the at least one copolymer is a methacrylic imidized polymer (MIP) comprising front about 1 to about 25 weight percent MMA; from about 5 to about 60 weight percent NVP; from about 0.05 to about 8 weight percent acid, measured as methacrylic acid; and from about 7 to about 80 weight percent N-methyl dimethylglutarimide, wherein the copolymer has a nitrogen content of from about 5 to about 10 weight percent and wherein all weight percents are based on the weight of the MIP.

In the preparation of the MIP from MMA-containing polymer, as known in the art, p(MMA) is converted to p(dimethylglutarimide) groups by reactive condensation with ammonia or amine, thus reducing the "MMA" content of the copolymer. Generally, the higher the glutarimide content, the lower is the MMA content of the resulting MIP. Residual acid may vary in level dependent upon the MIP preparation conditions and the extent of post-imidization ("capping") esterification reactions, described more fully in examples below.

The invention provides TPPUE blends having three (ternary), four (quarternary), or more components, some of which "higher" blends have been previously exemplified. Other TPPUE blends comprise, for example, one or more TPPUE, the copolymer, and one or more of a polar polymer. Polar polymer includes the aforementioned PVC, and includes homo- and co-polymers of PVC, chlorinated PVC, and the like; EVOH; polyesters (such as polyethylene terephthalate, polybutylene terephthalate, and the like), polyamide (e.g. nylon), and also includes, for example, poly(ethylene oxide)("PEO"); acrylonitrile/butadiene/styrene ("ABS") polymer; polycarbonate ("PC"); polyacetals such as poly(vinyl butyral)("PVB"), and the like; methacrylate/butadiene/styrene ("MBS") copolymers; styrene/maleic anhydride ("SMA"); SMA/MMA copolymer; styrene/maleimide copolymer; poly(phenylene ether) ("PPO"); polysulfones; copolymer of 2,6-dimethylphenol and 2,6-diphenyl phenol, and the like. A preferred TPPUE blend comprises from about 5 to about 60 wt. %, based on the weight of the blend, of one or more polar polymer selected from PVC, polyester, polyamide, PEO, polyacetal, or styrene/maleimide copolymer.

Copolymers of the inventive TPPUE blends may be prepared by emulsion polymerization or other suitably adapted polymerization methods such as solution, suspension, or bulk polymerization. Copolymers of, for example, MMA/NVP/MAA, or Styrene/NVP/AA, or MMA/Styrene/NVP/MAA, are preferably prepared by emulsion polymerization. The presence of AA or MAA has little noticeable effect on the polymerization reaction. The weight average molecular weight (Mw) of the copolymers of the invention may vary from about 10,000 to about 300,000. A preferred Mw range from about 10,000 to about 150,000, more preferably from about 20,000 to about 100,000, increasingly facilitates ease of processing, and thermal and rhelogical stability of the blend compositions. Blending of TPPUE with copolymer of the invention, for example, the above mentioned poly(MMA-NVP-MAA) terpolymer, may be carried out by dry mixing finely granulated copolymer particles prior to melt compounding in a single- or twin-screw extruder. The melt compounding, or melt blending, is carried out above the mixture melting temperature. Furthermore, in the blending or compounding process, minor quantities (i.e. typically less than 10 wt. % of the weight of the blend) of additives may be added to the mixture of TPPUE and copolymer, which additives may further improve or add other advantage to the physical properties of the blend. Examples of blend additives include one or more of the following classes of compounds: antioxidants, ultraviolet light absorbers, plasticizers, antistatic agents, slip agents, coloring agents, fillers, and flame retardants. The melt-blended mixture is extruded to yield the TPPUE blend.

Thus, there is provided a process for preparing a novel TPPUE blend comprising:

a) blending a mixture comprising from about 0.5 to about 99.5 weight percent of at least one TPPUE and from about 99.5 to about 0.5 weight percent of a copolymer derived from monomer units comprising:

from about 5 to about 95 weight percent of a N-vinyl lactam; and from about 95 to about 5 weight percent of at least one ethylenically unsaturated monomer unit, wherein the weight percent of monomer units is based upon the weight of the copolymer;

b) melt-blending the mixture at a temperature above a melting temperature of the mixture; and c) extruding the melt-blended mixture to provide the TPPUE blend.

Articles made from the TPPUE blend of the invention include those which preferably may be injection or extrusion molded; other molding means known in the art also may be used. Some of the useful articles of the TPPUE blends of the invention include, for example, automotive parts such as decorative exterior and interior trim, bearing cages, gas reservoirs, tank caps, sheathes and tubes for cables, cables, pipes, hoses and tubings, parts for fuel systems, fasteners for trim, window handles, windshield wiper blades, and the like; medical articles such as IV connectors, tubing, vials and other laboratory articles, and artificial heart valves; appliance parts such as tank liners, casters and wheels, snap-on connectors, bearings, housings, fan blades and the like; consumer goods such as buckles and fasteners, snow and water ski boot bindings; plumbing articles such as pipe connectors, housings for pumps and filters, valves, lavatory parts, and the like; business machine parts such as gears and transmission systems, telephone parts, and the like. Also, articles which are prepared by extrusion into films, foams, rods, sheets or slabs, monofilaments, and fibers are comtemplated for use by the blends of the invention.

The following non-limiting examples illustrate properties, means of preparing, and uses and advantages of the TPPUE blends of the invention.

EXAMPLES

GENERAL

All compositions referred to in the Examples are in weight percent unless otherwise specified. Mechanical and optical properties were measured and evaluated by the following ASTM test methods:

| Property | ASTM Method |
|---|---|
| Tensile Yield Strength, Elongation at Break, and Tensil Modulus | D 638-84 |
| Drop Weight Impact (Dynatup) | D 2444 |
| DTUFL (1.8 mPa load; C°; sample thickness, 6.4 mm) | D 648-72 |
| Izod Impact Test | D-256-84 |
| Luminous Transmittance and Haze | D-1003 |
| Yellowness Index (Yi-1) | D-1925-70 |

Additional tests were conducted on the TTPUE, copolymer, and blends of the invention and related control samples in the Examples. These tests, methods and equipment include conventional Differential Scanning Calorimetry (DSC), from which Tg and heat of fusion ($\Delta H_f$) were estimated; Dynamic Mechanical Thermal Analysis (DMTA) providing viscosity and indications of melt behavior; and gel permeation chromatography (GPC, using poly(MMA) standards), from which molecular weight data were obtained.

In the following tables, properties not measured are indicated by "NM" or as otherwise noted.

Example 1

MMA/NVP Copolymer

A. 75 MMA/25 NVP

This example describes the preparation of a copolymer of methyl methacrylate (MMA) and N-vinyl pyrrolidone (NVP) at a MMA/NVP weight ratio of 3/1. A monomer mixture (Mix M) was prepared containing 4237.5 grams MMA, 1412.5 grams NVP, 16.95 grams N-dodecyl mercaptan, 3334 grams deionized water and 105.9 grams of an aqueous solution of 10% by weight sodium dodecylbenzene sulfonate. The monomer mixture was polymerized as follows. To an appropriate glass vessel equipped with stirrer, heater, reflux condenser, and nitrogen sparge tube was added 7467.57 grams of deionized water, and 2.52 grams of sodium carbonate. The mixture was sparged for one hour with nitrogen while heating to 70° C. The sparge was then changed to a sweep over the solution and 317.81 grams of the 10% aqueous solution of sodium dodecylbenzene sulfonate was added to the mixture. The temperature of the reaction vessel was then raised to 85° C. At this temperature, 125 mL of the initiator mixture (Mix I, which consisted of 5.65 grams of sodium persulfate and 1618.86 grams of deionized water) was added to the reaction vessel. The monomer mixture (Mix M) was then fed linearly into the reaction vessel during three hours.

As the polymerization proceeded, the initiator mixture was added to the reaction vessel at the rate of 125 ml every 15 minutes. At the completion of the initiator and monomer additions, the mixture was held at 85° C. for one hour. The mixture was then cooled, filtered and the polymer isolated by freeze-drying. Some of the physical property data for the resulting dry MMA/NVP polymer are listed in Tables I and II. All preparative runs of Ex. 1A yielded molded plaques which exhibited very low haze, typically <1%. Luminous transmittance (LT) and Yi-1 color varied with purity and color of NVP monomer and with subsequent thermal exposure of the copolymer; measured values ranged as follows: LT, from about 85 to about 91% and Yi-1, from about 1 to about 30. No thermal or other stabilizers were added to this copolymer in its use in preparing the neat samples or in the TPPUE blends.

B. 90 MMA/10 NVP

This copolymer, having a 9:1 by weight ratio of MMA to NVP, was prepared using identical procedures as described for Example 1A, substituting the 9:1 monomer weight ratio for the 3:1 weight ratio described in Ex. 1A.

Examples 2–4

Thermoplastic Polyurethane Elastomers (TPPUEs)

The TPPUE's used in making and testing blends illustrative of the invention are described in Table A and are listed as Examples 2–4. Physical properties of TPPUE's of Ex's. 2, 3A, and 4 are provided in Tables I and II.

TABLE A

| Example No. and TPPUE Description | Commercially Available TPPUE (Used in blend Examples) |
|---|---|
| Example 2. An alkyl diol-based TPPUE: A polyurethane prepared from 4,4'-methylenediphenyl diisocyanate, 1,4-butane diol and poly (tetramethylene glycol), having specific gravity 1.16, Tg of 41° C., and a melting temperature (Tm) of 163° C. | PELLETHANE ™-2363-55D (DOW Chemical Co) |
| Examples 3A and 3B. Polyester diol-based TPPUEs: Polyurethane prepared from polyester diol, 4,4'-methylenediphenyl diisocyanate, and 1,4-butane diol. | |
| Ex. 3A - a clear, free-flowing (above melt temperature) polyurethane, having specific gravity 1.20, Tg of −39° C., Tm of 192° C. | Ex. 3A: ESTANE ™-58134 (B. F. Goodrich Co.) |
| Ex. 3B - a clear, free-flowing (above melt temperature) polyurethane of lower Mw/higher melt flow than Ex. 3A. | Ex. 3B: ESTANE ™ 58277 (B. F. Goodrich Co.) |
| Example 4. A polyether diol-based TPPUE: A polyurethane prepared from polyether diol, 4,4'-methylenediphenyl diisocyanate, and 1,4-butane diol, having sp. gr. 1.12, Tg of −40° C., and Tm 192° C. | ESTANE ™ 58309-021 (B. F. Goodrich Co.) |

The TPPUEs described in Table A were dried overnight in a forced air oven at 75° C. prior to being injection molded on an Arburg injection molding machine equipped with a heated ASTM family mold for the formation of test pieces. The molding conditions were as follows: Nozzle temperature—223° C.; Zone temperatures 1, 2, and 3: 236°, 247° and 226° C. respectively; Injection pressure—3.1 MPa; Back pressure—2.1 MPa; Mold temperature—49° C. Additional thermal and physical properties of the TPPUEs are recorded in Tables I and II.

Examples 5–8

Blends Prepared from Example 1A and Examples 2–4

The copolymer of Ex. 1A was dry blended with each of TPPUE Ex. 2, 3A, and 4 in the weight ratios of either 4:1 or 1:1 TPPUE to Ex. 1A as shown in Table I. Each mixture was first combined in a polyethylene bag prior to being fed into a single screw extruder of L/D=24:1 and compression ratio of 3:1. The processing conditions were as follows: Extruder barrel temperature: Zones-1, -2 and -3 were 197°, 207° and 207° C. respectively; Die temperatures were 199° and 201° C. The screw speed was 100 RPM.

The extrudates were fed to a water bath and a pelletizer. Dry pellets were injection molded on an Arburg injection molding machine equipped with a heated ASTM family mold, forming test pieces. Molding conditions were as follows: Nozzle: 223° C.; Zones 1, 2, and 3: 236°, 247° and 226° C. respectively; injection pressure 3.1 MPa; back pressure 2.1 MPa; mold temperature 49° C. Data for the thermal and mechanical properties of Blends of Examples 5–8 are recorded in Tables I and III.

TABLE I

Thermal Properties of Polymers (Ex's. 1A, 2–4) and Blends (Ex's 5–8)

| EX. | POLYMER or BLEND | COMP. (w/w) | Tg (°C.) | Tm (°C.) | ΔHf (J/g) |
|---|---|---|---|---|---|
| 1.A. | P(MMA-NVP = 75/25) | 100 | 123.60 | NM | NM |
| 2. | PELLETHANE 2363-55D | 100 | 41.10 | 162.67 | 19.87 |
| 3.A. | ESTANE 58134 | 100 | −39.26 | 191.58 | 9.28 |
| 4. | ESTANE 58309-021 | 100 | −39.52 | 192.13 | 9.72 |
| 5. | EX. 2/EX. 1A | 4/1 | 56.98 | 77.38 | 7.30 |
| 6. | EX. 2/EX. 1A | 1/1 | 83.21 | NM | NM |
| 7. | EX. 3A/EX. 1A | 4/1 | −37.22 | 168.00 | 2.62 |
| 8. | EX. 4/EX. 1A | 4/1 | −35.13 | 69.02 | 2.76 |

The thermal properties of the polymers and blends listed in Table I shows that the blends of the Ex. 1A acrylic copolymer, P(MMA-NVP=75/25), with TPPUE's are miscible. Evidence for miscibility is provided by the occurrence of a single Tg which lies between the Tg's of the respective components and by the absence of, or lowering of, the melting temperature of the TPPUE's in the blends.

TABLE II

Physical Properties of Ex. 1A Copolymer and TPPUEs of Exs. 2–4

| | EXAMPLES: | | | |
|---|---|---|---|---|
| PHYSICAL PROPERTY: | 1A | 2 | 3A | 4 |
| SPECIFIC GRAVITY | 1.20 | 1.16 | 1.20 | 1.12 |
| TENSILE-YIELD, MPa | 76.82 | 3.9 | 1.9 | 1.8 |
| ELONGATION @ BREAK % | 4.15 | >231.0 | >260.0 | >260.0 |
| TENSILE-MODULUS, GPa | 3.29 | 0.10 | 0.03 | 0.04 |
| DYNATUP IMPACT STRENGTH (J) | 2.28 | 46.46 | 64.77 | 27.56 |
| NOTCHED IZOD @ −20° C. (J/m) | | 1395.34 | 484.23 | 209.76 |
| NOTCHED IZOD @ 23° C. (J/m) | 19.22 | NM | NM | NM |
| DTUFL (1.82 MPa. 2° C./min.) (UNANNEALED) °C. | 85.20 | NM | NM | NM |
| DTUFL (1.82 MPa 2° C./min.) (ANNEALED) | 90.80 | NM | NM | NM |
| LUMINOUS TRANSMITTANCE | * | 90.8 | 68.8 | 75.7 |
| HAZE % | * | 1.0 | 31.8 | 89.4 |
| Yi-1 | * | 5.1 | 39.2 | 19.3 |

*Values varied with monomer quality; see Example 1A preparation.

TABLE III

Physical Properties of Blend Examples 5–8 Based on TPPUEs of Examples 2–4 with Acrylic Copolymer, P(MMA-NVP = 75/25; Ex. 1A).

| | EXAMPLES: | | | |
|---|---|---|---|---|
| | 5 | 6 | 7 | 8 |
| 2. PELLETHANE 2363-55D % (w/w) | 80 | 50 | — | — |
| 3A. ESTANE 58134 % (w/w) | — | — | 80 | — |
| 4. ESTANE 58309-021 % (w/w) | — | — | — | 80 |
| 1A. P(MMA-NVP = 75/25) % (w/w) | 20 | 50 | 20 | 20 |
| PHYSICAL PROPERTY | | | | |
| SPECIFIC GRAVITY | | 1.20 | 1.20 | |
| TENSILE-YIELD, MPa | 20.35 | 53.71 | 4.13 | 4.12 |
| ELONGATION @ BREAK % | >248.00 | 134.00 | >196.00 | >181.00 |
| TENSILE-MODULUS, GPa | 0.63 | 1.89 | 0.14 | 0.14 |
| DYNATUP IMPACT STRENGTH (J) | 57.33 | 2.28 | 56.10 | 55.21 |
| NOTCHED IZOD @ −20° C. (J/m) (HINGED) | NM | NM | 1379.86 | 1405.49 |
| NOTCHED IZOD @ 23° C. (J/m) (NO BREAK) | 1181.21 | 18.69 | 641.33 | 778.68 |
| DTUFL (1.82 MPa. 2° C./min.) (UNANNEALED) °C. | 39.20 | 57.65 | <38.00 | <38.00 |

TABLE III-continued

Physical Properties of Blend Examples 5–8 Based on TPPUEs of Examples
2–4 with Acrylic Copolymer, P(MMA-NVP = 75/25; Ex. 1A).

| | EXAMPLES: | | | |
|---|---|---|---|---|
| | 5 | 6 | 7 | 8 |
| DTUFL (1.82 MPa. 2° C./min.) (ANNEALED) °C. | 44.20 | 60.05 | 36.00 | 37.75 |
| LUMINOUS TRANSMITTANCE, % | * | NM | 72.9 | 73.6 |
| HAZE, % | * | NM | 31.1 | 30.9 |
| Yi-1 | * | NM | 38.3 | 32.5 |

*Values varied with monomer quality; see Example 1A preparation.

All blends of Table III are clear. Comparison of other property data listed in Tables II and III further shows that the incorporation of the N-vinyl lactam-containing copolymer into the TPPUE confers an overall improvement in mechanical properties. The blends of Examples 7 and 8 also exhibit low temperature impact results several fold superior to that of the TPPUE alone.

Improvement in the thermo-mechanical properties of TPPUE base resins in the blends also was discerned from a comparison of the Dynamic Mechanical Thermal Analysis (DMTA) spectra of the respective TPPUE and TPPUE blends with acrylic copolymers. The data obtained from the DMTA spectra yield information on the storage (E') and loss modulus (E") and loss tangent, "tangent delta." DMTA spectra show that a large loss process occurs in the vicinity of –40° C. This loss process is believed to correlate with the glass transition temperature, TABLE I, of the TPPUE and identifies the temperature at which the polyurethanes become rubbery in nature. Evidence of strong interaction in the blends also may be shown by comparatively broad tangent delta curves resulting from hindrance to the motion of the polyurethane chains. A comparison of the DMTA spectra shows that the transition, due to the Tg of the respective polyurethane, is shifted to higher temperature in the blends. This observation is supported by the DSC data presented in TABLE I. Further evidence of strong interaction between the polyurethane and copolymer is shown by the relative optical clarity of many blend compositions investigated within ranges indicated, as further described in following tables.

Example 9

Blend of Homopolymeric MMA and TPPUE of Example 2

A homopolymer of MMA was prepared for comparative purposes by using the procedures described in Example 1, where Mix M contains 5,650 g of MMA and no NVP. Polymerization and isolation were carried out as described. The dried p(MMA) of Mw approximately 150,000 was dry blended with the TPPUE of Ex. 2 and extruded by the procedures given in Ex. 5 to provide a 20/80 (w/w) blend designated Example 9. Its properties are included in Table IV.

Examples 10–16

Blends of Acrylic Copolymer (Ex. 1A) and TPPUE (Ex. 2)

The blends described in Table IV were prepared by melt compounding and extruding mixtures of the acrylic copolymer of Ex. 1A, p(MMA-NVP=75/25), with the TPPUE of Ex. 2 in weight ratios which span a weight ratio range of 90/10 to 10/90 of binary compositions. The blends were extruded, pelletized and injection molded into ASTM parts using the conditions described in Ex. 5. All blends of Ex. 10–16, containing the N-vinyl lactam copolymer, were clear; the blend having a copolymer without any N-vinyl lactam (Ex. 9) was opaque. Additional data for mechanical properties are listed in Tables IV and V.

TABLE IV

Physical Properties of Blends of TPPUE with Copolymer Ex. 1A, and Homopolymer Ex. 9

| | EXAMPLES: | | | |
|---|---|---|---|---|
| | 9 | 10 | 11 | 12 |
| 2. PELLETHANE 2363-55D % (w/w) | 20 | 10 | 20 | 30 |
| 9. P(MMA) % (w/w) | 80 | — | — | — |
| 1A. P(MMA-NVP = 75/25) % (w/w) | — | 90 | 80 | 70 |
| PHYSICAL PROPERTY | | | | |
| TENSILE-YIELD, MPa | 54.51 | 68.39 | 63.86 | 59.31 |
| ELONGATION @ BREAK % | >57.40 | 9.33 | 22.70 | >39.30 |
| TENSILE-MODULUS, GPa | 2.31 | 3.11 | 2.84 | 2.49 |
| DYNATUP IMPACT STRENGTH (J) | 2.18 | 2.53 | 1.88 | 2.10 |
| NOTCHED IZOD @ 23° C. (J/m) | 17.62 | 12.82 | 9.08 | 13.35 |
| DTUFL (1.82 MPa. 2° C./min.) (UNANNEALED) °C. | 89.80 | 84.50 | 73.90 | NM |
| DTUFL (1.82 MPa. 2° C./min.) (ANNEALED) °C. | 96.90 | 94.90 | 85.50 | 78.95 |

TABLE V

Physical Properties of Varying Ratio Blends of TPPUE with Copolymer, Ex. 1A

| | EXAMPLES: | | | |
|---|---|---|---|---|
| | 13 | 14 | 15 | 16 |
| 2. PELLETHANE 2363-55D % (w/w) | 40 | 60 | 70 | 90 |
| 1A. P(MMA-NVP = 75/25) % (w/w) | 60 | 40 | 30 | 10 |
| PHYSICAL PROPERTY | | | | |
| TENSILE-YIELD, MPa | 53.54 | 35.82 | 24.58 | 7.31 |
| ELONGATION @ BREAK % | >71.20 | 196.00 | >218.00 | >184.00 |
| TENSILE-MODULUS, GPa | 2.04 | 1.25 | 0.91 | 0.23 |
| DYNATUP IMPACT STRENGTH (J) | 3.21 | 80.37 | 72.00 | 44.86 |
| NOTCHED IZOD @ 23° C. (J/m) | 20.29 | 34.71 | 43.25 | NM |
| DTUFL (1.82 MPa. 2° C./min.) (UNANNEALED) °C. | 58.80 | 49.25 | 43.85 | NM |
| DTUFL (1.82 MPa. 2° C./min.) (ANNEALED) °C. | 62.85 | 51.35 | 46.00 | 41.35 |
| LUMINOUS TRANSMITTANCE % | NM | NM | NM | 88.1 |
| HAZE, % | NM | NM | NM | 2.5 |
| Yi-1 | NM | NM | NM | 10.0 |

All blends of Tables IV and V having copolymer containing N-vinyl lactam are clear. Ex. 9 describes a blend of the acrylic homopolymer (pMMA), i.e. "copolymer" containing no N-vinyl lactam, with the same TPPUE. In spite of the fact that the mechanical properties of blend Ex. 9, TABLE IV, are comparable to that of the blend composition described by Ex. 11, these two blends differ remarkably in clarity. Thus, all TPPUE blends of the copolymer containing N-vinyl lactam, Ex. 1A, are clear in appearance whereas the blend of pMMA (containing no lactam) with TPPUE of Ex. 2 is opaque and exhibits a significant amount of pearlescence. The blend data also show higher tensile yield and modulus for those samples having more than about 60 wt. % of Ex. 1A, in comparison with the non-lactam containing "copolymer" blend of Ex. 9.

Example 17

MMA/NVP/MAA Copolymer

This example describes the preparation of an acid-containing NVP copolymer, a terpolymer of 74.5 wt. % methyl methacrylate (MMA), 25 wt. % N-vinyl pyrrolidone (NVP), and 0.5% methacrylic acid (MAA). A monomer mixture was prepared, having the described MMA:NVP:MAA ratio, using 4181 g. MMA, 1412.5 g. NVP, and 56.5 g. MAA, and 67.8 g. N-dodecyl mercaptan (for MW control), 3363.4 g. deionized water and 105.9 g. of a 10% aqueous sodium dodecylbenzene sulfonate solution.

To an appropriate glass vessel equipped with stirrer, heater, a reflux condenser and nitrogen sparge tube was added 7534 g. deionized water and 2.52 g. sodium carbonate. The mixture was sparged for one hour with nitrogen while heating to 70° C. The sparge rate was then changed to a sweep and 317.81 grams of a 10% aqueous solution of sodium dodecylbenzene sulfonate was added to the mixture. The temperature of the reaction vessel was then raised to 85° C. At this temperature, 126 ml of an initiator mixture (5.65 g. sodium persulfate and 1633.27 g. deionized water) was added to the reaction vessel. The monomer mixture was then fed into the reaction vessel linearly and continuously during three hours. As polymerization proceeded, the initiator mixture was added to the reaction vessel at the rate of 126 ml every 15 minutes. Upon completing initiator and monomer mixture feeds, the polymer mixture was held at 85° C. for one hour. The mixture was then cooled, filtered and the polymer isolated by coagulation with a 2% solution of magnesium acetate. The polymer was water washed, filtered and dried in a vacuum oven prior to extrusion and blending. The Mw of this polymer was about 50,000.

Examples 18–20

Blends Prepared from Example 17 and Examples 2–4

The terpolymer of Ex. 17 was dry blended with each of three TPPUEs (Examples 2, 3A, 4) in the weight ratio of 4:1 TPPUE to copolymer. Each dry blend was first combined in a polyethylene bag prior to being fed into a single screw extruder of L/D=24:1 and compression ratio of 3:1. The processing conditions were as follows: Extruder barrel temperature: Zones-1, -2 and -3 were 197°, 207° and 207° C. respectively; Die temperatures were 199° and 201° C., and the screw speed was 100 RPM.

The extrudates were fed to a water bath and a pelletizer. The pellets were dried and injection molded on an Arburg injection molding machine equipped with a heated ASTM family mold to form test pieces. The molding conditions were as follows: Nozzle: 223° C.; Zones 1, 2, and 3: 236°, 247° and 226° C. respectively; injection pressure 3.1 MPa; back pressure 2.1 MPa; mold temperature 49° C. Mechanical properties of the molded materials of the respective Examples 18–20 are summarized in Table VI. TABLE VI.

TABLE VI

Physical Properties of Blends of TPPUEs of Examples 2–4 with the Copolymer of Ex. 17, p(MMA-NVP-MAA)

| | EXAMPLES: | | |
|---|---|---|---|
| | 18 | 19 | 20 |
| 2. PELLETHANE 2363-55D % (w/w) | 80 | — | — |
| 3A. ESTANE 58134 % (w/w) | — | 80 | — |
| 4. ESTANE 58309-021 % (w/w) | — | — | 80 |
| 17. p(MMA-NVP-MAA) % (w/w) | 20 | 20 | 20 |
| PHYSICAL PROPERTY | | | |
| SPECIFIC GRAVITY | 1.17 | 1.20 | 1.20 |
| TENSILE-YIELD, MPa | 19.66 | 4.88 | 3.78 |
| ELONGATION @ BREAK % | >250.00 | >260.00 | >188.00 |
| TENSILE-MODULUS, GPa | 0.67 | 0.18 | 0.10 |
| DYNATUP IMPACT STRENGTH (J) | 56.13 | 56.24 | 49.36 |
| NOTCHED IZOD @ −20° C. (J/m) (HINGED/BUCKLE) | 59.27 | 1452.48 | 692.70 |
| NOTCHED IZOD @ 23° C. (J/m) (NO BREAK) | NM | NM | 7.17 |
| DTUFL (1.82 MPa. 2° C./min.) (UNANNEALED) °C. | NM | NM | <38.0 |
| DTUFL (1.82 MPa. 2° C./min.) (ANNEALED) °C. | 45.75 | NM | <38.0 |
| LUMINOUS TRANSMITTANCE, % | 68.7 | 77.1 | 60.2 |
| HAZE, % | 61.1 | 30.7 | 68.8 |
| Yi-1 | 27.8 | 33.0 | 54.1 |

The data in TABLE VI demonstrate the effect of incorporating the NVP/acrylic/acid-containing terpolymer into a TPPUE. Comparison of these data with those of Table III shows that the presence of carboxylic acid on the acrylic copolymer further improves the clarity of the polyester diol-based TPPUE, but has the opposite effect on the polyether diol-based TPPUE. The mechanical properties of the blends listed in Tables III and VI are generally superior to those of the base TPPUE polymers listed in Table II.

Examples 21–25

Imidized NVP Copolymers

Table VII describes "imidized" (methyl methacrylate-co-N-vinyl pyrrolidone) copolymers used in preparing blends with TPPUE. These examples of "MIP" polymers were prepared by known imidization processes, for example as described in U.S. Pat. No. 4,246,374. The precursors used in preparing the exemplified imidized copolymers, methyl amine and the acrylic copolymer, p(MMA-NVP), of either Example 1A or 1B, were reacted at elevated temperatures in a devolatizing extruder. The resulting imidized samples so prepared are designated "MMIP(MMA-NVP)HC, or HU, or LU" where "MMI" refers to "methacrylic/methyl amine imidized" and "HC, HU or LU" refers to the extent of imidization ("high or low"), related to their total nitrogen content, and whether the imidized polymer is "capped" ("C"), meaning reduced in residual acid content via the use of "capping" (esterifying) agents, such as dimethyl carbonate, reactive with residual acid, or "uncapped" ("U"), meaning not treated with capping agent to reduce residual acid or anhydride content. For example, "HU" means "highly imidized and uncapped," according to the relative amount of residual free acid and anhydride present on the polymer backbone, as summarized in Table VII.

TABLE VII

Chemical Composition of Imidized, p(MMA-NVP) Copolymers.

| EX. | POLYMERS | ACID (% w/w) | TOTAL ACID[1] (% w/w) | EXTENT OF IMIDIZATION | NITROGEN[2] (% w/w) |
|---|---|---|---|---|---|
| 21. | MMIP(MMA-NVP = 75/25)HC | <0.1 | 0.4 | HIGH, CAP. | 7.68–7.98 |
| 22. | MMIP(MMA-NVP = 75/25)HU | 5.9 | 6.7 | HIGH, UNCAP. | 7.95–8.10 |
| 23. | MMIP(MMA-NVP = 5/25)LU | 3.3 | 4.8 | LOW, UNCAP. | 7.46–7.56 |
| 24. | MMIP(MMA-NVP = 90/10)LU | 1.2 | 3.7 | LOW, UNCAP. | 5.7–5.78 |
| 25. | MMIP(MMA-NVP = 90/10)HC | 0.0 | 0.1–0.2 | HIGH, CAP. | 6.84–7.0 |

Notes:
[1]Total Acid includes free acid and anhydride, reported as % wt. as MAA.
[2]Total nitrogen in the resulting MIP copolymer.

Examples 26–39

MIP and TPPUE Blends
General

The imidized acrylic copolymers, MMIP(imidized MMA-NVP), described in Examples 21–25 (Table VII) were dry blended with three TPPUEs (Examples 2, 3A, 4) in the weight ratios of 4:1 and 1:1 TPPUE to imidized acrylic copolymer, as further described below. Each mixture was first combined in a polyethylene bag prior to being fed into a single screw extruder of L/D=24:1 and compression ratio of 3:1. The processing conditions were as follows: Extruder barrel temperature: Zones-1, -2 and -3 were 197°, 207° and 207° C. respectively; Die temperatures were 199° and 201° C. and the screw speed was 100 RPM.

The extrudates were fed to a water bath and a pelletizer. The pellets were dried prior to injection molding on an Arburg injection molding machine equipped with a heated ASTM family mold for the formation of test pieces. The molding conditions were as follows: Nozzle: 223° C.; Zones 1, 2, and 3: 236°, 247° and 226° C. respectively; injection pressure 3.1 MPa; back pressure 2.1 MPa; mold temperature 49° C. Data for the blend compositions and blend ratios and the thermal and mechanical properties of the blends are recorded in Tables VIII–XII. Note that Tm and Heat of fusion data were not obtained for a blend when a single, distinct Tg was measured for the blend.

p(MMA-NVP=75/25), into a TPPUE matrix increases the glass transition temperature. However, blends comprising TPPUE's and the imidized acrylic copolymer of Ex. 1B, p(MMA-NVP=90/10), show the presence of multiple phases (they exhibit two Tg's.) The occurrence of multiple phases in these blends suggest that the imidized p(MMA-NVP=90/10) copolymer is at least compatible, but probably not fully miscible, with the TPPUE matrix polymers. The relatively low level of NVP in the copolymer of blends Ex's 27, 32 and 33 provides blends which are clear but which are not as fully compatible (miscible) as those, such as Ex's. 26, and 28–31, having higher levels of NVP present in the MIP (these latter Examples based on MMA/NVP having 25 wt % NVP).

TABLE VIII

Thermal Properties of TPPUE, Imidized Copolymer, and TPPUE Blends with Imidized Copolymer

| EX. | POLYMER or BLEND | COMP. (w/w) | Tg (°C.) | Tm (°C.)[1] | ΔHf (J/g)[1] |
|---|---|---|---|---|---|
| | TPPUE or Copolymer: | | | | |
| 2. | PELLETHANE 2363-55D | 100 | 41.10 | 162.67 | 19.87 |
| 3A. | ESTANE 58134 | 100 | −39.26 | 191.58 | 9.28 |
| 4. | ESTANE 58309-021 | 100 | −39.52 | 192.13 | 9.72 |
| 21. | MMIP(MMA-NVP = 75/25)HC | 100 | 145.33 | | |
| 22. | MMIP(MMA-NVP = 75/25)HU | 100 | 158.86 | | |
| 23. | MMIP(MMA-NVP = 75/25)LU | 100 | 157.02 | | |
| 24. | MMIP(MMA-NVP = 90/10)LU | 100 | 144.81 | | |
| 25. | MMIP(MMA-NVP = 90/10)HC | 100 | 148.60 | | |
| | TPPUE/MIP Blends: | | | | |
| 26. | EX. 2/EX. 21 | 1/1 | 100.25 | | |
| 27. | EX. 2/EX. 25 | 1/1 | 60.88; 107.19 | NM | NM |
| 28. | EX. 3A/EX. 22 | 1/1 | 134.46 | | |
| 29. | EX. 4/EX. 22 | 1/1 | 133.95 | | |
| 30. | EX. 3A/EX. 23 | 1/1 | 115.36 | | |
| 31. | EX. 4/EX. 23 | 1/1 | −40.71 | | |
| 32. | EX. 3A/EX. 24 | 1/1 | −36.91; 75.19 | 169.30 | 1.36 |
| 33. | EX. 4/EX. 24 | 1/1 | −37.29; 74.72 | 168.78 | 0.62 |

Notes:
[1]Mentioned above, Tm and ΔHf data were not obtained when a single, distinct Tg was measured for a blend.

The TPPUE blends of Table VIII all are clear. The thermal properties of the polymers and blends listed in TABLE VIII reveal that inclusion of the imidized copolymer of Ex. 1A.,

TABLE IX

Physical Properties of Blends of TPPUE with Imidized Acrylic Copolymers of Examples 21, 22 and 25

| | EXAMPLES: (by % by weight) | | | |
|---|---|---|---|---|
| | 26 | 27 | 28 | 29 |
| 2. PELLETHANE 2363-55D2 | 50 | 50 | — | — |
| 3A. ESTANE 58134 | — | — | 50 | — |
| 4. ESTANE 58309-021 | — | — | — | 50 |
| 21. MMIP(MMA-NVP = 75/25)HC | 50 | — | — | — |
| 22. MMIP(MMA-NVP = 75/25)HU | — | — | 50 | 50 |
| 25. MMIP(MMA-NVP = 90/10)HC | — | 50 | — | — |
| PHYSICAL PROPERTY | | | | |
| TENSILE-YIELD, MPa | 52.85 | 45.58 | 32.71 | 32.96 |
| ELONGATION @ BREAK % | 134.00 | 158.00 | 99.20 | 90.70 |
| TENSILE-MODULUS, GPa | 2.05 | 1.82 | 0.97 | 1.08 |
| DYNATUP IMPACT STRENGTH (J) | 3.09 | 39.32 | 34.61 | 35.72 |
| NOTCHED IZOD @ 23° C. (J/m) | 12.829 | 27.23 | 97.72 | 107.87 |
| DTUFL (1.82 MPa 2° C./min.) (UNANNEALED) °C. | 64.70 | 68.9 | 72.55 | 76.3 |
| DTUFL (1.82 MPa 2° C./min.) (ANNEALED) °C. | 72.25 | 79.70 | 85.40 | 88.95 |

All of the TPPUE blends of Table IX are clear. The physical properties, for example, the tensile elongation, modulus and yield, impact, and heat distortion values, are unique and unexpected for binary blends comprising an elastomer and a glassy polymer.

acrylic copolymers exhibited relatively high tensile modulus, heat deflection temperatures and impact resistance without showing any evidence of nacreous effect.

TABLE X

Physical Properties of Blends of TPPUE with Imidized Acrylic Copolymers of Examples 23 and 24

| | EXAMPLES: (by % by Weight) | | | |
|---|---|---|---|---|
| | 30 | 31 | 32 | 33 |
| 3A. ESTANE 58134 | 50 | — | 50 | — |
| 4. ESTANE 58309-021 | — | 50 | — | 50 |
| 23. MMIP(MMA-NVP = 75/25)LU | 50 | 50 | — | — |
| 24. MMIP(MMA-NVP = 90/10)LU | — | — | 50 | 50 |
| PHYSICAL PROPERTY | | | | |
| TENSILE-YIELD, MPa | 37.38 | 37.08 | 45.54 | 46.10 |
| ELONGATION @ BREAK % | 159.75 | 166.00 | 198.00 | 209.00 |
| TENSILE-MODULUS, GPa | 1.36 | 1.37 | 1.69 | 1.36 |
| DYNATUP IMPACT STRENGTH (J) | 48.39 | 32.68 | 66.24 | 69.02 |
| NOTCHED IZOD @ 23° C. (J/m) | 152.72 | 131.90 | 24.56 | 38.45 |
| DTUFL (1.82 MPa 2° C./min.) (UNANNEALED) °C. | 63.35 | 67.05 | 48.40 | 52.05 |
| DTUFL (1.82 MPa 2° C./min.) (ANNEALED) °C. | 73.65 | 77.60 | 54.85 | 54.00 |

All of the TPPUE blends of Table X are clear. As also apparent from the Table X data, the binary blends of both ether diol-based and ester diol-based TPPUE with imidized

TABLE XI

Physical Properties of Blends of TPPUE with Imidized Acrylic Copolymers of Examples 22 and 23

| | EXAMPLES: (by % by Weight) | | | |
|---|---|---|---|---|
| | 34 | 35 | 36 | 37 |
| 3A ESTANE 58134 | 80 | — | 80 | — |
| 4. ESTANE 58309-021 | — | 80 | — | 80 |

TABLE XI-continued

Physical Properties of Blends of TPPUE with Imidized Acrylic Copolymers of Examples 22 and 23

| | EXAMPLES: (by % by Weight) | | | |
|---|---|---|---|---|
| | 34 | 35 | 36 | 37 |
| 22. MMIP(MMA-NVP = 75/25)HU | 20 | 20 | — | — |
| 23. MMIP(MMA-NVP = 75/25)LU | — | — | 20 | 20 |
| PHYSICAL PROPERTY | | | | |
| TENSILE-YIELD, MPa | 58.70 | 49.35 | 51.27 | 47.51 |
| ELONGATION @ BREAK % | >253.00 | >252.00 | 253.00 | 251.00 |
| TENSILE-MODULUS, GPa | 0.10 | 0.11 | 0.16 | 0.16 |
| DYNATUP IMPACT STRENGTH (J) | 49.27 | 50.02 | 47.35 | 49.32 |
| DTUFL (1.82 MPa 2° C./min.) (UNANNEALED) °C. | 43.10 | 45.15 | 42.65 | 44.10 |
| DTUFL (1.82 MPa 2° C./min.) (ANNEALED) °C. | 55.70 | 42.80 | 45.75 | 44.00 |

TABLE XII

Physical Properties of Blends of TPPUE with Imidized Acrylic Copolymer of Example 24

| | EXAMPLES: (by % by Weight) | |
|---|---|---|
| | 38 | 39 |
| 3A. ESTANE 58134 | 80 | — |
| 4. ESTANE 58309-021 | — | 80 |
| 24. MMIP(MMA-NVP = 90/10)LU | 20 | 20 |
| PHYSICAL PROPERTY | | |
| TENSILE-YIELD, MPa | 56.15 | 56.78 |
| ELONGATION @ BREAK % | >252.00 | >319.00 |
| TENSILE-MODULUS, GPa | 0.11 | 0.11 |
| DYNATUP IMPACT STRENGTH (J) | 64.78 | 59.98 |
| DTUFL (1.82 MPa 2° C./min.) (UNANNEALED) °C. | <38.00 | <38.00 |

Comparison of data presented in Tables XI and XII shows that imidized acrylic copolymer having an NVP level of 25% yields TPPUE blends having generally improved modulus and DTUFL over the blends having similar imidized acrylic copolymers, but of lower (10%) NVP content. More broadly, the mechanical properties of the blends comprising the imidized acrylic copolymers of Tables IX–XII show that the combination of TPPUE's and imidized acrylic copolymer in a binary blend substantially improves the tensile yield over TPPUE alone. Impact properties of the polyether-diol based TPPUE (Ex. 4) also are substantially improved in the blends having MIP copolymer (e.g. Ex's 35, 37, and 39).

TABLE XIII

Melt Viscosity Versus Shear Rate of TPPUE Ex. 2 and a Blend of Ex. 2 and Ex. 17, p(MMA/NVP/MAA = 74.5/25/0.5), Blend Ex. 18, at 205° C.

| EXAMPLE | SHEAR RATE (1/s) | VISCOSITY (Pa.s) |
|---|---|---|
| 2. | 9.6 | 424.7 |
| | 20.0 | 488.5 |
| | 52.8 | 447.5 |
| | 109.7 | 371.0 |
| | 225.4 | 299.7 |
| | 567.7 | 229.4 |
| | 1214.0 | 166.9 |
| | 2736.0 | 107.4 |
| 18. | 9.4 | 603.4 |
| | 20.6 | 710.6 |
| | 53.7 | 590.7 |
| | 109.8 | 489.1 |
| | 237.2 | 377.4 |
| | 596.9 | 261.8 |
| | 1288.0 | 178.7 |
| | 2577.0 | 122.8 |

The melt viscosity data of Table XIII show that a blend (Ex. 18) of a TPPUE (Ex. 2) and the acid-containing copolymer, P(MMA/NVP/MAA=74.5/25/0.5) of Example 17 has higher melt viscosity than the TPPUE alone.

Examples 40–45

Binary and Ternary TPPUE Blends and Comparative Examples

Table XIV, following, presents comparative thermal properties of two TPPUEs, copolymer, and binary and ternary TPPUE blends. The single Tg's of the binary blends defined by Examples 40 and 41, prepared by the methods previously described, show that the N-vinyl lactam-containing copolymer of Ex. 1A. is miscible with both the polyether diol-based TPPUE and the polyester diol-based TPPUE. It is also noted that a binary blend containing only the p-ether diol- and the p-ester diol-based TPPUE, here designated Ex. 42, is opaque in appearance, whereas the binary blends of either the p-ether diol- or p-ester diol-based TPPUE with the copolymer of p(MMA-NVP=75/25), Examples 40 and 41, are optically clear in appearance. The ternary blends comprising the p-ether diol- and p-ester diol-based TPPUE's and the N-vinyl lactam-containing copolymer of Ex. 1A are clear in appearance. Example 45, with the ternary blend components approximately one-third each, shows a single Tg and is of high clarity.

TABLE XIV

Thermal Properties of Polymers and Binary and Ternary TPPUE Blends

| EX. | POLYMER or BLEND | COMP. % (w/w) | Tg (°C.) | Tm (°C.) | ΔHf (J/g) |
|---|---|---|---|---|---|
| 1A. | p(MMA-NVP = 75/25) | 100 | 124.91 | NM | NM |
| 3B. | ESTANE 58277 | 100 | −07.24 | 133.36 | 13.75 |
| 4. | ESTANE 58309-021 | 100 | −40.66 | 160.56 | 14.84 |
| 40. | EX. 1A/EX. 3B | 50/50 | 55.61 | NM | NM |
| 41. | EX. 1A/EX. 4 | 50/50 | 70.09 | NM | NM |
| 42. | EX. 3B/EX. 4 | 50/50 | −43; −9.0 | 140.3 | 14.0 |
| 43. | EX. 1A/EX. 3B/EX. 4 | 10/45/45 | −44.8; 14.25 | 144.75 | 9.16 |
| 44. | EX. 1A/EX. 3B/EX. 4 | 20/40/40 | −17.7 | 152.0 | 2.59 |
| 45. | EX. 1A/EX. 3B/EX. 4 | 30/35/35 | 16.78 | NM | NM |

Examples 46–50

Ternary Blend (Ex.50) of Ex. 1A, TPPUE, and PVC (Example 46), and Comparative Examples The thermal properties of the homopolymers and blends listed in Table XV show that the N-vinyl lactam-containing copolymer of Ex. 1A., p(MMA-NVP=75/25), is miscible with PVC having a K value of 57 (designated Example 46), as shown by the blend, Ex. 47, and the polyether diol-based TPPUE of Example 4, as shown by the blend, Ex. 48. Furthermore, the single Tg of the ternary blend: Ex. 1A/PVC, Ex. 46/TPPUE, Ex.4, which blend is designated Ex. 50 in Table XV, shows that the copolymer p(MMA-NVP=75/25) acts as a compatibilizer between TPPUE and PVC (whereas the comparative binary blend of TPPUE and PVC (Ex. 49), not containing the copolymer, shows its inherent non-compatibility by Tg, melting point, and heat of fusion).

TABLE XV

Thermal Properties of Polymers and Binary and Ternary Blends:
Ex. 50: Copolymer/PVC/TPPUE

| EX. | POLYMER/BLEND | COMP. % (w/w) | Tg (°C.) | Tm (°C.) | ΔHf (J/g) |
|---|---|---|---|---|---|
| 1A. | P(MMA-NVP = 75/25) | 100 | 126.03 | NM | NM |
| 46. | PVC(OXY-185)[1] | 100 | 93.47 | NM | NM |
| 4. | ESTANE 58309-021 | 100 | −40.66 | 160.56 | 14.84 |
| 47. | EX. 1A/EX. 46 | 50/50 | 106.08 | NM | NM |
| 48. | EX. 1A/EX. 4 | 50/50 | 62.90 | NM | NM |
| 49. | EX. 46/EX. 4 | 50/50 | 81.37 | 156.83 | 6.74 |
| 50. | EX. 1A/EX. 46/EX. 4 | 30/35/35 | 97.17 | NM | NM |

Notes:
[1]Oxy-185, is a homopolymer of PVC having a K value of 57, obtained from Occidental Chemical Corp.

The following examples, Examples 51–59, are further illustrative of the invention and, if carried out as described, would provide the general results as described. These blends are believed to be clear to transmitted light and would exhibit improved tensile modulus over the TPPUE component of the blends.

Example 51

A TPPUE Blend Having an Amido-Methacrylate-Containing Copolymer

This example illustrates a blend composition comprising the terpolymer, p(MMA/methacryloylethyl ethylene urea)/NVP=75/10/15), and the TPPUE of Ex. 2. The acrylic terpolymer is prepared by the method described in Ex. 1A, substituting the correct monomer weights from which the terpolymer is derived. To prepare the TPPUE blend, a dry mixture of 3 parts of the terpolymer and 1 part of the TPPUE of Ex. 2 is first combined in a polyethylene bag prior to being fed into a single screw extruder of L/D=24:1 and compression ratio of 3:1. The processing conditions are approximately as follows: Extruder barrel temperature: Zones-1, -2 and -3 are 197°, 207° and 207° C. respectively; Die temperatures are 199° and 201° C., and the screw speed is 80 RPM.

The extrudates are fed to a water bath and a pelletizer. The pellets are dried prior to injection molding on an Arburg injection molding machine equipped with a heated ASTM family mold for the formation of test pieces. The molding conditions are approximately as follows: Nozzle: 223° C.; Zones 1, 2, and 3: 236°, 247° and 226° C. respectively; injection pressure 3.1 MPa; back pressure 2.1 MPa; mold temperature 49° C. Physical property values are tested according to the ASTM methods defined previously.

Example 52

A TPPUE Blend having a BMA/Styrene/NVP Copolymer

Using the polymerization technique and procedures exemplified by EX. 1A, a terpolymer, comprising butyl methacrylate (BMA), styrene and N-vinyl pyrrolidone in the weight ratio of 20:55:25 is prepared and isolated as a dry powder. The terpolymer is combined with a sample of the TPPUE of Ex. 2 in the weight ratio of 1:9. The mixture is first homogenized in a polyethylene bag prior to being fed into a single screw extruder of L/D=24:1 and compression ratio of 3:1. The processing and molding conditions are as described in Example 51.

Example 53

A TPPUE Blend Having an EA/HEMA/NVP Copolymer

Using the polymerization technique and procedures exemplified by EX. 1A, a terpolymer, comprising ethyl acrylate (EA), hydroxyethyl methacrylate (HEMA) and N-vinyl pyrrolidone in the weight ratio of: 20:55:25 is prepared and isolated as a dry powder. The terpolymer is combined with a sample of the TPPUE of EX. 2 in the weight ratio of 1:9, and is converted to molded test pieces by the processing and molding conditions as described in Example 51.

Example 54

A TPPUE Blend Having a Styrene/Maleic Anhydride/NVP Copolymer

The polymerization technique described in EX. 1A is used to prepare a terpolymer derived from styrene, maleic anhydride and N-vinyl pyrrolidone in the weight ratio of:

74:01:25. The terpolymer is isolated as a dry powder. The terpolymer was combined with a sample of the TPPUE of EX. 2 in the weight ratio of 1:9 and is converted to molded test pieces by the processing and molding conditions as described in Example 51.

Example 55

A TPPUE Blend Having a MMA/Styrene/Acrylic Acid/NVP Copolymer

The polymerization process of EX. 1A is used to prepare a tetrapolymer derived from methyl methacrylate, styrene, acrylic acid and N-vinyl pyrrolidone in the weight ratio of: 30:44:01:25. The tetrapolymer is isolated as a dry powder and is combined with a sample of the TPPUE of EX. 2 in the weight ratio of 1:3 and is converted to molded test pieces by the processing and molding conditions as described in Example 51.

Example 56

A TPPUE Blend having a BA/Styrene/Aminopropyl-Acrylamide/NVP Copolymer

This example describes the preparation of a blend composition comprising a tetrapolymer of n-butyl acrylate (BA), styrene, 3-(diethylamino)propyl acrylamide and N-vinyl pyrrolidone in the weight ratio of: 30:45:05:20 and the TPPUE of EX. 2. The tetrapolymer is prepared by the process described in Ex. 1A. The terpolymer is combined with a sample of the TPPUE of EX. 2 in the weight ratio of 1:9 and is converted to molded test pieces by the processing and molding conditions as described in Example 51.

Example 57

A TPPUE Blend Having a MMA/BA/NVP Copolymer and a Polar Polymer(Polycarbonate)

A blend composition comprising 35 wt. % TPPUE (Ex. 3A); 35 wt. % polycarbonate (Mobay CD 2000); and 30 wt. % of an acrylic terpolymer (p(MMA-BAN-VP=55/20/25, prepared and isolated by the processing technique described in Ex. 1A) is melt compounded on a Werner-Pfleiderer compounding twin-screw extruder. The TPPUE and polycarbonate and acrylic terpolymer are dried for 2 hours at 100° C. prior to dry blending and subsequent melt compounding in the extruder. The blend composition is extruded under the processing conditions described in Ex. 51. The extrudates were cooled in a water bath and chopped into pellets. The pellets are dried for 2 hours at 105° C. prior to injection molding on an Arburg molding machine. The molding conditions and ASTM test methods used in the physical properties evaluation are described in Ex. 56.

Example 58

A TPPUE Blend Having a MMA/BA/NVP Copolymer and a Polar Polymer(Polyvinylbutyral)

This example exemplifies blends comprising the TPPUE of EX. 3, a polar polymer, polyvinyl butyral (PVB) and an acrylic terpolymer (p(BA-MMA-NVP=30/45/25)). (The PVB contains a nominal 18% residual vinyl alcohol and is obtained in powder form from Monsanto Company as Butvar™ resin.)

A dry mixture comprising the PVB, TPPUE and the acrylic terpolymer (the terpolymer prepared as described in Ex 1A, substituting BA, MMA and NVP monomers for the Ex. 1A monomer charges in the proportion 30/45/25, respectively) is tumble blended in a polyethylene bag prior to melt compounding in a single screw extruder. The dry blend is then fed via a hopper into the extruder. The mixture is melt compounded under the processing conditions described in EX. 51 and the extrudates are cooled in a water bath and pelletized. The pellets are dried in a forced air oven prior to casting into thin films.

Example 59

A TPPUE Blend Having a Core/Shell Copolymer With a Bd/Styrene Core and a MMA/NVP/MAA Shell A polymer exhibiting core/shell morphology comprising a butadiene/styrene (98/02 wt. %) rubber core and a thermoplastic shell comprising p(MMA-NVP-MAA=74/25/01) is prepared by an emulsion polymerization technique in which a previously prepared butadiene/styrene latex is used as the "seed" or "preform" emulsion upon which the shell polymer is polymerized. The thermoplastic shell is prepared by the described emulsion polymerization technique of EX. 1A, the core stage having been conducted in a closed reactor under pressure, typical of butadiene emulsion polymerization. Following monomer conversion to the shell stage, a core/shell polymer is obtained having a composition: (Core)Butadiene-Styrene=98/02 to (Shell)p(MMA-NVP-MAA)=74/25/01 of 4:1, respectively. The core shell polymer is combined with the TPPUE of Ex. 2 and melt compounded, by methods similar to the methods described in Ex. 51.

Other embodiments of the invention will be apparent to those skilled in the art from a consideration of this specification or practice of the invention disclosed herein. It is intended that the specification and examples be considered exemplary only, with the true scope and spirit of the invention indicated by the following claims.

I claim:

1. A clear miscible thermoplastic polyurethane elastomer (TPPUE) blend, comprising:

a) from about 0.5 to about 99.5 weight percent of at least one TPPUE; and b) from about 99.5 to about 0.5 weight percent of a copolymer derived from monomer units comprising:
      from about 5 to about 60 weight percent of an N-vinyl lactam;
      from about 95 to about 40 weight percent of at least one ethylenically unsaturated monomer unit selected from the group consisting of $C_1$–$C_8$ alkyl acrylate and C1–C4 alkyl methacrylate; and optionally, from 1 to 10 weight percent of an acid monomer unit, wherein the weight percent of monomer units is based upon the weight of the copolymer, and further wherein the clear miscible thermoplastic blend has a light transmittance (clarity) equal to or greater than the light transmittance (clarity) of the TPPUE.

2. The TPPUE blend of claim 1 wherein the TPPUE is derived from a diol selected from a $C_2$–$C_8$ alkyl-based diol, a polyether-based diol, a polyester-based diol, or mixtures thereof.

3. The TPPUE blend of claim 2 wherein the TPPUE comprises an admixture of a polyether diol-based TPPUE and a polyester diol-based TPPUE.

4. The TPPUE blend of claim 3 wherein each TPPUE comprises from about 25 to about 40 weight percent of the blend.

5. The TPPUE blend of claim 1 wherein the N-vinyl lactam has the following structural formula:

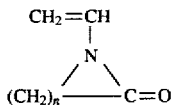

wherein n is an integer of 2 to 4.

6. The TPPUE blend of claim 5 wherein from about 5 to about 75 weight percent of the weight of the N-vinyl lactam monomer of the copolymer is substituted by a copolymerizable amido-containing monomer unit selected from a vinyl amide, an amido-ethyl (meth)acrylic ester, an ureido-ethyl (meth)acrylic ester, an N-vinyl amide, or mixtures thereof.

7. The TPPUE blend of claim 6 wherein the copolymerizable amido-containing monomer unit is selected from acrylamide, methacrylamide, methacryloylethyl ethyleneurea, or N-vinyl acetamide.

8. The TPPUE blend of claim 1 wherein the ethylenically unsaturated monomer is selected from ethyl acrylate, methyl methacrylate, butyl methacrylate, or mixtures thereof.

9. The TPPUE blend of claim 1 wherein the N-vinyl lactam is N-vinyl pyrrolidone.

10. The TPPUE blend of claim 9 wherein the copolymer is derived from monomer units comprising:

from about 10 to about 50 weight percent N-vinyl pyrrolidone; and from about 50 to about 90 weight percent methyl methacrylate.

11. The TPPUE blend of claim 1 wherein the acid monomer unit is selected from acrylic, methacrylic, crotonic, itaconic, maleic, fumaric, acryloxypropionic, alpha-methylene-delta-methyl-glutaric, acid, or mixtures thereof.

12. The TPPUE blend of claim 11 wherein the copolymer further comprises: from about 5 to about 49 weight percent N-vinyl pyrrolidone;

from about 50 to about 94 weight percent of methyl methacrylate; and from about 1 to about 10 weight percent of an acid monomer unit selected from acrylic or methacrylic acid, the weight percents based on the weight of the copolymer.

13. The TPPUE blend of claim 12 wherein the copolymer comprises:

from about 5 to about 39 weight percent N-vinyl pyrrolidone;

from about 60 to about 94 weight percent methyl methacrylate; and from about 1 to about 5 weight percent methacrylic acid.

14. The TPPUE blend of claim 1 further comprising front about 5 to about 60 weight percent, based on the weight of the blend, of one or more polar polymers selected from poly(vinyl chloride), polyester, polyamide, poly(ethylene oxide), polyacetal, or styrene/maleimide copolymer.

15. The TPPUE blend of claim 1 wherein the at least one copolymer is a methacrylic imidized polymer (MIP) comprising:

from about 1 to about 25 weight percent methyl methacrylate;

from about 5 to about 60 weight percent N-vinyl pyrrolidone;

from about 0.05 to about 8 weight percent acid, measured as methacrylic acid; and from about 7 to about 80 weight percent N-methyl dimethylglutarimide, wherein the copolymer has a nitrogen content of from about 5 to about 10 weight percent, and wherein all weight percents are based on the weight of the methacrylic imidized polymer.

16. An injection-molded or extruded article having the composition of claim 1.

17. An article according to claim 16 wherein the article is in the form of a film, foam, rod, sheet, slab, monofilament, or fiber.

18. A clear miscible thermoplastic polyurethane elastomer (TPPUE) blend, comprising:

a) from about 0.5 to about 99.5 weight percent of at least one TPPUE; and b) from about 99.5 to about 0.5 weight percent of a multi-stage polymer comprising:

from about 30 to about 90 weight percent, based on the weight of the multi-stage polymer, of a first stage polymer derived from a monomer unit selected from butadiene, styrene, $C_2$–$C_8$ alkyl acrylate, $C_1$–$C_4$ alkyl methacrylate, or mixtures thereof; and from about 10 to about 70 weight percent, based on the weight of the multi-stage polymer, of at least one outer stage polymer derived from about 5 to about 35 weight percent of N-vinyl lactam and from about 95 to about 65 weight percent of a monomer unit selected from $C_1$–$C_2$ alkyl acrylate, $C_1$–$C_4$ alkyl methacrylate, styrene, alpha-methyl styrene, vinyl toluene, or mixtures thereof, and from about 0 to about 10 weight percent of an acid monomer unit selected from (meth)acrylic acid, crotonic acid, maleic acid, fumaric acid, itaconic acid, 3-phenyl-2-propenic acid, or mixtures thereof, the weight percent monomer units in the at least one outer stage polymer based on the weight of the at least one outer stage polymer, and wherein the clear miscible blend has a light transmittance (clarity) equal to or greater than the light transmittance (clarity) of the TPPUE.

19. A process for preparing a clear miscible TPPUE blend comprising:

a) blending a mixture comprising from about 0.5 to about 99.5 weight percent of at least one TPPUE and from about 99.5 to about 0.5 weight percent of a copolymer derived from monomer units comprising:

from about 5 to about 60 weight percent of an N-vinyl lactam;

from about 95 to about 40 weight percent of at least one ethylenically unsaturated monomer unit selected from the group consisting of $C_1$–$C_8$ alkyl acrylate and $C_1$–$C_4$ alkyl methacrylate; and optionally, from 1 to 10 weight percent of an acid monomer unit, wherein the weight percent of monomer units is based upon the weight of the copolymer;

b) melt-blending the mixture at a temperature above a melting temperature of the mixture; and c) extruding the melt-blended mixture to provide the clear miscible TPPUE blend wherein the clear miscible thermoplastic blend has a light transmittance (clarity) equal to or greater than the light transmittance (clarity) of the TPPUE.

* * * * *